Figure 1:
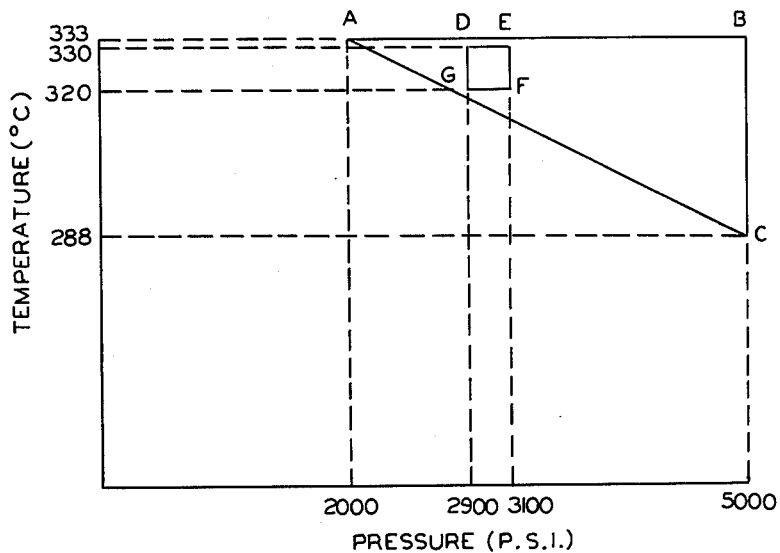

United States Patent Office 3,218,320
Patented Nov. 16, 1965

3,218,320
PROCESS FOR PRODUCING A MELAMINE-UREA PRODUCT
Ivan Christoffel, Hopewell, and Fred L. Kelly, Chester, Va., assignors to Allied Chemical Corporation, New York, N.Y., a corporation of New York
Filed June 19, 1961, Ser. No. 117,934
4 Claims. (Cl. 260—249.7)

This invention relates to a process for producing melamine, and more particularly to a continuous process for the production of melamine-urea mixtures.

Many pyrolytic processes have been disclosed for the conversion of urea to melamine. In these processes, urea is converted to melamine quite slowly at temperatures of about 300° C., and more rapidly at higher temperatures. Unfortunately, the increased reactivity of urea at higher pyrolytic temperatures is accompanied by an increasing tendency for the melamine product to decompose into condensation products such as melam, melem, and melon. In addition, the reaction mixture is corrosive to the containing vessel at these elevated temperatures. It has been disclosed, however, that in the presence of such catalysts as arsenic and antimony oxides, urea is efficiently converted to melamine at temperatures as low as 300° C. Nevertheless, even at these lower temperatures the corrosiveness of the reaction mixture is still severe.

This corrosion problem is great in both batch and continuous pyrolysis of urea to melamine. It is known that in tubular reactors, the corrosion rate for a given material of construction tends to vary according to the composition of the reaction mixture, and is relatively low toward the terminal section of the reactor.

It has been proposed to decrease the corrosive action of the reaction mixture by using a continuous process wherein urea is pyrolyzed to melamine at temperatures from 380° to 600° C. under conditions in which the reaction mixture possesses a high percentage of melamine throughout. Notwithstanding this high melamine content, operation at these elevated temperatures still causes considerable corrosion.

It is an object of the present invention to produce directly from urea, without the necessity of any purification other than the expulsion of gaseous products, an adhesive grade melamine suitable for the manufacture of melamine-urea-formaldehyde resin adhesives.

Another object of the invention is to produce directly such a melamine-urea product free from substantial quantities of objectionable impurities, and containing at least 84 percent melamine and at least 94 percent of compounds reactive with formaldehyde to produce resinous compounds functioning as adhesives.

A further object is to conduct the reaction at practical rates under conditions which are substantially less corrosive than those heretofore employed, and yet to provide a fluid reaction mixture which can be adapted without difficulty to continuous operation.

According to our invention, urea is injected into a molten urea-melamine mixture containing a boron compound as a catalyst at a temperature maintained at about 288° to about 333° C., and under a correlated pressure sufficient to maintain the mixture in a fluid condition, and the rates of injecting urea and withdrawing product are controlled to maintain the urea content of the mixture between about 4 and about 15 percent by weight of the melamine in the reaction mixture.

The pressure should be at least 2000 p.s.i. and desirably is between 2000 and 5000 p.s.i., preferably about 3000 p.s.i. The boron compound may be added along with the urea in amounts corresponding to 0.5 percent to 2 percent by weight thereof.

During the pyrolysis of urea, ammonia and carbon dioxide are produced as gaseous by-products. By correlating the pressure of these gaseous products in the reactor with the reaction temperature, the melting point of the mixture may be varied. The pressures which are used fall within the area ABC of FIGURE 1 of the accompanying drawings, wherein the minimum lower pressures correspond to the higher temperatures of the molten urea-melamine mixture. All points within the area of rectangle DEFG in FIGURE 1 correspond to preferred conditions for carrying out the process.

The greater the pressure, the lower the melting point of the reaction mixture within the reaction temperature ranges specified for operation of the process. Thus, we may use higher pressures in lieu of higher temperatures to maintain a liquid reaction mixture. It should be noted, however, that if this pressure effect is utilized without the presence of the catalyst to speed the urea to melamine reaction through the intermediate stages in which the compounds are relatively infusible, a satisfactory fluid condition is not obtained.

The catalyst for the reaction is a water-soluble boron compound which may be either boron oxide, a meta-, ortho-, tetra-, or perborate of an alkali metal, metaboric ($HBO_2$), orthoboric ($H_3BO_3$) or tetraboric ($H_2B_4O_7$) acid. Preferred as catalysts are such boron compounds as boron oxide, orthoboric acid, and metaboric acid.

Molten urea is injected into the reaction mixture at a rate sufficient to maintain the urea content at about 4 to 15 percent by weight of the melamine in the reactor.

It might be expected that operation of the proposed process at relatively low temperatures would decrease the production rate as compared with prior art processes operated at advanced temperatures. However with the use of the boron catalysts, as described hereinabove, rates as high as 44 pounds of melamine/hr./cu.ft. reactor space are achieved. At preferred conditions, yields of melamine as high as 90 percent are obtained in one hour of reaction time.

Melamine-modified urea-formaldehyde resin compositions are useful as adhesives in the bonding of various materials, such as wood panels to form plywood and wood chips to form chipboard. The preparation of melamine-urea mixtures as described hereinabove is readily applicable for the preparation of such adhesives by the addition of the requisite amount of an aqueous, non-resinous, polymethylolurea solution.

As illustrative embodiments of the preparation of melamine-urea mixtures and their corresponding urea-formaldehyde adhesives, the following examples are given. The parts and percentages are by weight, and the temperatures are in degrees centigrade.

EXAMPLE 1.—PREPARATION OF CRUDE UREA-MELAMINE

Urea as a 70 percent aqueous solution is mixed with about 1 percent boron oxide ($B_2O_3$) or a water-soluble borate salt, based on the urea content. The resulting solution is fed to the top of a vertical shell and tube film concentrator, the first of two similar units. The urea flows down the inside of the tubes while air, which may or may not be preheated, flows upward. The shell side is heated to about 170° with steam, and water is removed to produce a concentrated feed for the second film-type unit. The operation of the second concentrator is the same as the first, except that the countercurrent air is preheated to about 150° or higher to reduce the water content of the urea flowing out the base to about 0.5 percent.

Figure 2:
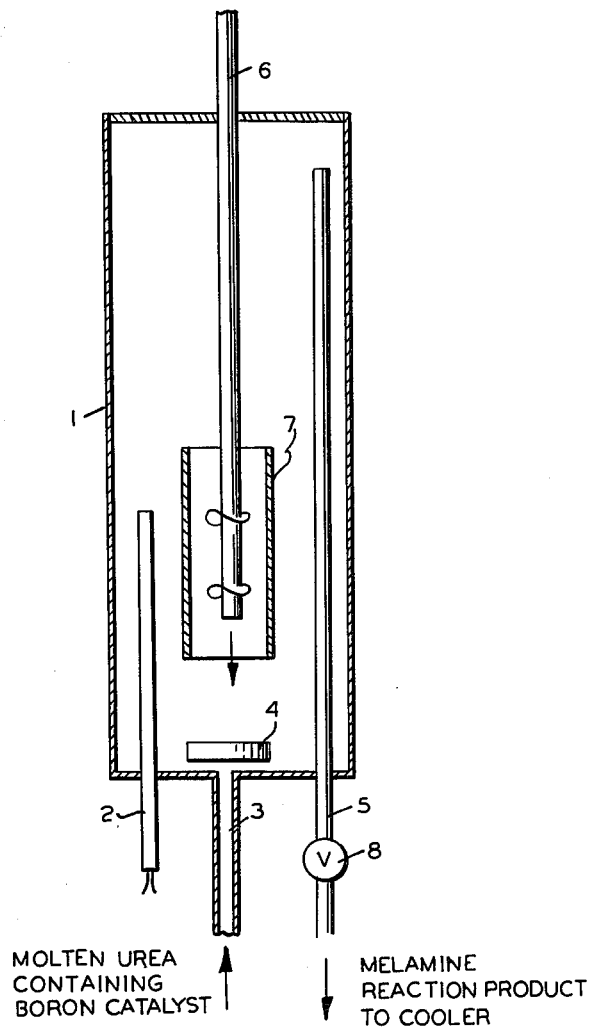

A reactor in which the pyrolysis may take place is illustrated in FIGURE 2 of the drawings by a schematic line drawing.

Referring now to FIGURE 2, a Hastelloy-C (a nickel-based molybdenum-iron-chromium alloy) lined reaction vessel receives the melt from the reactor feed pumps. The reactors are "stirred pot"-type reactors consisting of a vertical cylindrical shell 1 fitted with six Hastelloy-C sheathed bayonet electrical heating elements 2. Each reactor has a liquid capacity of about 60 minutes melamine production. The urea enters through a bottom tube 3 beneath a flow guide 4 designed to divert the incoming material into the space about the heaters. The molten urea is pyrolyzed under about 3000 p.s.i. pressure at a temperature between about 320° and 330°. Material is withdrawn through an outlet tube 5 designed to accept the overflow of the reaction mixture near the top of the vessel. Agitation is effected by a top entering propeller-type mechanical stirrer 6 whose paddles are encased in a cylindrical tube 7. The reaction mixture circulates in the reactor, passing downward through tube 7, aided by the propeller action of the mechanical stirrer, then upward between tube 7 and the reactor wall.

The pyrolyzed mixture, having the composition: 31–34 percent melamine, 26–28 percent ammonia, 34–37 percent carbon dioxide, 1–5 percent urea, 1 percent $B_2O_3$ and 0.1–2 percent ammeline, flows out of the overflow tube 5, to a let-down valve 8, and the temperature of the issuing mixture is reduced by the adiabatic vaporization of the melamine and expansion of the gases which absorb a part of the sensible heat of the mixture.

For dry recovery of the crude melamine, the gas stream containing melamine vapor is led into contact with a cooled surface on which the crude melamine is solidified. Such a surface may be the wall of a conventional heat exchanger, a large metal vessel with cooled walls, a cooled drum, or even cooled balls or pebbles in motion. In such vaporization processing and cooling, the melamine vapors are condensed at a temperature below about 100°, but above 60°. Melamine may be removed from the solidifying surface by scraping or other conventional means.

Composition of a typical crude melamine product follows:

| Compound: | Percent in product |
|---|---|
| Melamine | 84–92 |
| Urea | 4–10 |
| Ammeline | 0.3–5.0 |
| $B_2O_3$ | About 3 |

Due to the forced circulation in the reactor, the composition of the reaction mixture is nearly the same throughout the reactor; also product removed from the reactor has practically the same ratio of its components as the non-gaseous portion of the reaction mixture.

Under the reaction conditions noted above, considerable amounts of ammonia and carbon dioxide are produced. If desired, the ammonia and carbon dioxide thus formed can be collected, converted to urea under the proper conditions of temperature and pressure, and the urea thus produced can be recycled to the above described reactor to manufacture more melamine. In this manner, an extremely high yield of melamine can be attained.

EXAMPLE 2.—PREPARATION OF A MELAMINE-UREA-FORMALDEHYDE ADHESIVE

To a 37 percent aqueous formaldehyde solution containing less than 1.5 percent methanol, sufficient 1 N sodium hydroxide is added to increase the pH of the formaldehyde solution to 8.6–8.7. The aqueous, alkaline, formaldehyde solution is then warmed to 30°, and sufficient crystalline urea is added thereto with stirring to give a formaldehyde-urea solution with a mole ratio of formaldehyde to urea of about 4.9:1 by weight. The resulting reaction mixture, having a pH of about 8.9–9.0, is heated in a tubular film evaporator at 50°–55° for 1–2 hours under 50 mm. Hg pressure. In this manner, the aqueous urea-formaldehyde solution is concentrated to 53% of its original weight.

The product drawn from the film evaporator is a clear, aqueous solution of the urea-formaldehyde reaction product, containing about 85 percent by weight of total solids, and a mole ratio of formaldehyde to urea of about 4.7:1. The product is not a resin, but contains urea and formaldehyde reacted only to the polymethylolurea stage. A product of this type is available commercially under the trademark U.F. Concentrate 85 of Allied Chemical Corporation.

This liquid, non-resinous, urea-formaldehyde reaction product is added to the crude melamine-urea mixture thusly:

To 41.0 parts by weight of the crude melamine was added 63.1 parts of said urea-formaldehyde reaction product with stirring to form a smooth slurry. A buffer solution consisting of 1.58 parts of hexamethylenetetramine in 32 parts of water was added together with an extender consisting of 15 parts of wheat flour and 2 parts walnut shell flour. The resulting mixture was stirred for 30 minutes to give an adhesive having a pH of 6.7 and a gel time of 50 seconds at 100°. The adhesive was applied to one-tenth inch birch plies at a spread of 30 pounds per 1000 square feet of single line glue. Plies were assembled and cured at 150° under 200 p.s.i. pressure for 5 minutes to produce test boards. The test boards had a dry shear strength of 345 p.s.i., and a wet shear strength of 283 p.s.i. The wet and dry shear strength tests were carried out in accordance with U.S. Department of Commerce Commercial Standard, C.S. 35–56. In similar tests, 2.1 parts of ammonium chloride was added to the above-described buffer solution in preparing the adhesive; the corresponding dry and wet shear strengths of test boards were 386 p.s.i. and 363 p.s.i., respectively.

EXAMPLE 3

The following experiments were carried out to show the surprising effects of the addition of catalyst according to the present invention:

Urea was heated in closed Hastelloy-C tubes at 330° C. with and without the addition of catalyst. The applied pressures were self-generated; they are dependent upon the volume of the reaction products relative to the reaction space, the character of the reaction and the applied temperature. A loading density was selected to give a maximum pressure of about 3000 p.s.i. at 330° C. The following table shows the yield of melamine obtained:

*Table I*

| Addition | Temperature, °C. | Time, Minutes | Percent Melamine Production |
|---|---|---|---|
| None | 330 | 5 | 0 |
| 1.7% $H_3BO_3$ | 330 | 5 | 26 |
| None | 330 | 15 | 1 |
| 1.7% $H_3BO_3$ | 330 | 15 | 73 |
| None | 330 | 30 | 1.7 |
| 1.7% $H_3BO_3$ | 330 | 30 | 81 |
| None | 330 | 45 | 2 |
| 1.7% $H_3BO_3$ | 330 | 45 | 94 |

A high yield of ammelide-ammeline mixture was obtained in all the tests carried out without the addition of catalyst.

EXAMPLE 4

In accordance with the invention it has been found possible to conduct the reaction at practical rates under conditions which are substantially less corrosive than those heretofore employed, and yet to provide a fluid reaction mixture which is adapted without difficulty to continuous operation. The following tests were carried out in a Hastelloy-C reactor to show the extent of corrosion at temperature conditions specified in the present invention, as contrasted with higher temperatures. Hastelloy-C, a nickel-molybdenum-chromium iron alloy, is one of the most corrosion-resistant alloys available; its percent composition is 15.5–17.5 Cr, 0.15 maximum C, 16–18 Mo, 1 maximum Si, 1 maximum Mn, 4.5–7 Fe, 3.75–4.75 W, 0.04 maximum P, 0.03 maximum S, balance Ni.

Operation was in accordance with the conditions of Example 1, except that in the first part of the test, the reaction mass was held at about 330° C. and in the second part of the test the reaction mass was held at about 360° C. The feed urea contained 1.75 pounds $H_3BO_3$ per 100 pounds of urea. The material produced at each temperature was analyzed for iron and nickel to determine the relative corrosion rates at the two temperatures. The following tabulation of results shows that corrosion was at least three times as great at the higher temperature:

| Reaction Temperature, °C. | Parts Per Million in Crude Melamine Product | |
|---|---|---|
| | Iron | Nickel |
| 330 | 10 | 1 |
| 360 | 30 | 4 |

It will be realized that higher temperatures than 360° C. would result in even higher corrosion rates.

While the above describes the preferred embodiments of the invention, it will be understood that departures may be made therefrom within the scope of the specification and claims.

We claim:

1. The process for the production of a melamine-urea mixture which comprises injecting urea into a molten urea-melamine mixture containing a boron compound as a catalyst and under pressure of urea pyrolysis products in the gas phase, removing molten urea-melamine product containing about 4% to about 15% by weight urea from the reactor, controlling the rates of injecting the urea and removing said product to maintain the urea content in the mixture at about 4% to about 15% by weight of the melamine in the mixture, and correlating the temperature and pressure of the mixture so that their numerical values lie within the triangular temperature-pressure diagram ABC of FIGURE 1 of the drawings, wherein A represents 333° C. and 2000 p.s.i. pressure; B represents 333° C. and 5000 p.s.i. pressure, and C represents 288° C. and 5000 p.s.i. pressure.

2. A process as defined by claim 1, wherein the boron compound is a member selected from the group consisting of boron oxide, orthoboric acid, tetraboric acid, metaboric acid, and the ortho-, tetra-, meta-, and perborates of the alkali metals, and comprises from about 0.5 to about 2 percent of the weight of the molten urea mass.

3. A process for the production of a melamine-urea mixture which comprises continuously injecting molten urea, containing from about 0.5 to about 2 percent by weight of said urea of a boron compound selected from the group consisting of boron oxide, sodium borate, potassium borate, orthoboric acid, metaboric acid, and tetraboric acid, into a molten urea-melamine mixture at a temperature between about 320° and about 330° C., and under pressure of urea pyrolysis products in the gas phase from about 2900 to about 3100 p.s.i., said molten urea being injected at a rate sufficient to maintain the urea content at about 4–15 percent by weight of the melamine in the reactor, continuously removing a portion of the molten urea-melamine product from the reactor, and maintaining the pressure in the reactor by controlling the gaseous products released.

4. The process for the production of a melamine-urea mixture which comprises injecting molten urea containing about 0.5% to about 2% by weight of a boron compound selected from the group consisting of boron oxide, sodium borate, potassium borate, orthoboric acid, metaboric acid, and tetraboric acid, into the lower portion of a column of reaction mixture comprising melamine, urea, and reaction by-products, said column of reaction mixture being heated so as to provide a vertical portion in contact with a source of heat sufficient to maintain its temperature at between 288° and 333° C., and an adjacent vertical portion more remote from said source of heat, directing said boron-containing urea into intimate contact with the first vertical portion of said column of reaction mixture, whereby said urea is caused to pyrolyze to melamine thereby producing a mixture of urea and melamine which by forced circulation flows upward in said first vertical portion of said reaction mixture, adding heat to said upwardly circulating mixture so as to continuously pyrolyze urea to melamine, removing part of the melamine-urea mixture from the upper portion of said column, said removed part containing about 4% to about 15% urea, and recirculating the remaining part to the lower portion of the column with the aid of forced circulation in that portion of the column more remote from the source of heat, maintaining the composition of the reaction mixture throughout the reactor substantially the same as the product by controlling the rate of introduction of urea, the rate of removal of product and the rate of circulation of the reaction mixture, and correlating the temperature and pressure so that their numerical values lie within the triangular temperature-pressure diagram ABC of FIGURE 1 of the drawings, wherein A represents 333° C. and 2000 p.s.i. pressure, B represents 333° C. and 5000 p.s.i. pressure, and C represents 288° C. and 5000 p.s.i. pressure.

References Cited by the Examiner

UNITED STATES PATENTS

| 2,499,373 | 2/1950 | Dyer | 260—249.7 |
| 2,727,037 | 12/1955 | Hochwalt | 260—249.7 |
| 2,776,284 | 1/1957 | Hood | 260—249.7 |
| 2,776,286 | 1/1957 | Lobdell | 260—249.7 |
| 2,915,502 | 12/1959 | Albrecht | 260—67.6 |
| 2,998,411 | 8/1961 | Housekeeper | 260—67.6 |
| 3,054,796 | 9/1962 | Fisher et al. | 260—249.7 |

FOREIGN PATENTS

| 561,303 | 8/1958 | Canada. |
| 577,925 | 6/1959 | Canada. |
| 633,572 | 12/1961 | Canada. |

OTHER REFERENCES

Smolin et al.: "s-Triazines and Derivatives," Interscience Publishing Company, 1959, pages 373–378.

WALTER A. MODANCE, *Primary Examiner.*

IRVING MARCS, DUVAL T. McCUTCHEN,
*Examiners.*